3,677,980
FOAMED POLYOLEFIN FILMS
Anthony Graham Marshall Last, Welwyn Garden City, England, assignor to Imperial Chemical Industries Limited, London, England
No Drawing. Filed May 14, 1970, Ser. No. 37,316
Claims priority, application Great Britain, May 21, 1969, 25,864/69
Int. Cl. C08f 47/10, 29/04, 45/04
U.S. Cl. 260—2.5 HA                     6 Claims

ABSTRACT OF THE DISCLOSURE

Foamed film containing a mixture of titanium dioxide and coarsely divided metallic aluminum.

---

This invention relates to foamed polyolefin films.

A very useful method for the production of these films is described in our copending application No. 3,362/67 in which they are produced by extruding polyolefin material which contains a blowing agent system comprising a mixture of two blowing agents. The first blowing agent in the system is completely miscible with the molten polyolefin and the second blowing agent has a solubility of at least 0.01% by weight in the polyolefin and a critical temperature less than the temperature of the homogeneous mixture at the point when the pressure on the mixture is released.

The foamed polyolefin films thus produced are very useful for applications such as wallpaper, disposable bed linen and in the production of leather-like laminates. For a number of these applications, it is desirable that the material should be opaque and it is also desirable that it should have a substantially matt white appearance, not unduly tinged with greyness. It has been previously found that in order to get the required opacity, a very large amount of opacifying pigment has to be added, this adds greatly to the cost of the film and may lead to difficulties in extrusion and processing.

Accordingly, we provide an opaque film of a foamed polyolefin composition, which contains as an opacifying pigment from 5 to 20% by weight of titanium dioxide and from 0.05 to 1.0% by weight of metallic aluminum particles, the median particle size (by number) of the aluminum being at least $20\mu$ and not more than 20% by weight of the aluminum particles being of particle size less than $10\mu$.

By an opaque film, we means a film which has an opacity of at least 92% as measured by the following test:

Light is shone from a standard source onto the surface of the test sample which is backed by a totally reflecting Magnesium Carbonate block. The light reflected is collected in an integrating cube which energises a photocell whose output is recorded on a galvanometer. The sensitivity of the galvanometer is adjusted to read 100 units (corresponding to 100% opaque). The sample and magnesium carbonate block are then replaced by a totally absorbing black material which represents complete transparency and the mechanical zero of the galvanometer is adjusted to give a reading of 0 units on the 0–100 scale of the instrument. The sample is then placed on the instrument backed by the totally absorbing black material; the reading on the scale is the measure of opacity (expressed as a percentage of total opacity).

The titanium dioxide which we prefer to use is the normal commercial grade of this material which normally has a particle size in the range of from 0.1 to $2.0\mu$.

The present invention is applicable to foamed films of most polyolefins including crystalline and non-crystalline polyolefins. Examples of suitable polyolefins including polymers and copolymers of ethylene including those produced by the high pressure polymerisation process and the crystalline polymers produced by the Ziegler type polymers and copolymers of propylene, polymers and copolymers of 4-methylpentene-1 and polymers and copolymers of butene may also be used. Blends of these various olefin polymers may be used. The choice of the polyolefin composition will depend on the purpose to which the foamed film is to be put. Our preferred polyolefin, because of its cheapness and ready availability, is low density polyethylene. However, for some applications, particularly wallpaper, it is necessary to increase the abrasion resistance of foamed low density polyethylene films and we have found that this may conveniently be achieved by blending a crystalline polyolefin such as high density polyethylene, by which is understood polyethylene of density greater than 0.94, with the low density polyethylene. If the foamed films are to be used for wallpaper or similar applications it is important that they retain printing and that the ink abrasion resistance be good. In this instance we find it convenient to manufacture the film from a blend and to subject the foamed film to a surface treatment such as corona discharge treatment as is described in our copending application No. 4,647/70.

The median particle size of the aluminum powder which we use may be as great as $100\mu$ or even more and material which is known as "flitters" and which is mainly composed of plate-like particles of about this size is particularly suitable. As stated above, it is essential that not more than 20% by weight of the aluminum should have a particle size less than $10\mu$, since otherwise an undesirable degree of greyness is imparted to the finished product. We prefer to use aluminum particles of such particle size that they have a covering power on water of less than 5000 square centimeters per gram as determined by the method of Edwards and Mason (see Industrial Engineering Chemistry, Analysis Edition, volume 6, page 159, dated May 1934). In particular we prefer that the aluminum particles have a covering power on water of less than 4500 square centimeters per gram more particularly in the range 3300 to 3600 square centimeters per gram. Foamed films containing aluminum particles having a covering power greater than 4500 square centimeters per gram tend to be too grey for most applications.

The pigments may be incorporated into the polymer which is used for the production of our foamed film at any suitable stage during its production, but it is most convenient added to the polymer powder and uniformly dispersed therein—e.g. by tumble blending. The mixture may then be fed into the hopper of an extrusion machine. We find that sufficiently uniform blending of the pigments in the polymer may be obtained by tumble blending for about five minutes. It is undesirable that the blending should be extended for any longer time, since this leads to a breaking up of the aluminum particles and to the production of an undesirably large amount of very small particles, i.e. less than $10\mu$ in size.

The foamed films of the present invention may be produced in any suitable manner and our preferred method is to extrude a tube of the polyolefin composition containing a blowing agent which vaporises on extrusion to foam the tube. In our preferred process the tube is expanded after extrusion by internal air pressure to produce foamed film of the required thickness. Any suitable blowing agent may be used to foam the polyolefin composition; however, we prefer to use a two component blowing agent system of the type described in our copending application No. 3,362/67. The two component blowing agents consist of a first blowing agent which is miscible with the molten polyolefin and which vaporises on extrusion to foam the polyolefin and the second blowing agent has a critical temperature less than the extrusion temperature so that it is a vapor as the polyolefin is being extruded and acts as a nucleating agent for the cells formed by the vaporization of the first blowing agent. When such blowing agent systems are used we prefer to use an excess of the first blowing agent so that as it vaporizes it also has a cooling effect on the extruded tube thus setting it in its foamed state.

The foamed films of the present invention may be used in a wide variety of applications. For example, they may be used as wall and ceiling covering materials, as materials for disposable clothes and disposable bed linen, as synthetic leather or synthetic paper. The foamed films may, if necessary, be laminated to various substrates to give rise to improved strength or to provide any desired backing.

The present invention is illustrated, but in no way limited, by the following examples:

EXAMPLE 1

A composition comprising 86% of polyethylene of melt flow index 0.7 and 14% of a pigmented polyethylene, comprising 33% of polyethylene and 67% of titanium dioxide were blended together with 0.05% by weight of the total composition of aluminum flitters of median particles of size about $20\mu$ and which contained about 10% of particles of size less than $5\mu$ was tumble blended for five minutes. The resultant composition was fed to an extruder and mixed with a blowing agent system comprising nitrogen and petroleum ether as described in our copending application No. 3,362/67 and extruded in the form of a foamed film. The thickness of this material was 0.016 inch and its density was 0.12 g./cc. It had an opacity of 92%. Although the film had a grey tinge it was not unacceptably grey.

EXAMPLE 2

The procedure of Example 1 was repeated, except that the aluminum particles used were of median particle size about $150\mu$ and there were no particles of particle size less than $10\mu$. The proportion of aluminum which was used was about 0.33%. The resultant film had a thickness of 0.0135 inch, a density of 0.19 g./cc., had an opacity of 90% and was of acceptable colour.

EXAMPLE 3

The conditions of Example 2 were repeated, except that the composition which was used to produce the foamed film contained 0.6% of aluminum flitters, instead of 0.33%. The resultant film, which was of thickness 0.015 inch and density 0.17 g./cc. had an opacity of 95%.

EXAMPLE 4

The procedure of Example 1 was repeated, except that a tumble blending time of about 20 minutes, instead of 5 minutes was used. The resultant film, which had a density of 0.17 g./cc. and a thickness of 0.015 inch, had an acceptable opacity of 93% but the product was fairly grey and was, therefore, not quite acceptable.

EXAMPLE 5

The procedure of Example 1 and Example 2 were again repeated, but the median particle size of the aluminum used was only about $8\mu$. The resultant product had a very poor opacity (about 84 to 86%) and thus was quite unacceptable.

I claim:

1. An opaque film having an opacity of at least 92% of a foamed polyolefin composition which contains as an opacifying pigment from 5 to 20% by weight of titanium dioxide and from 0.05 to 1.0% by weight of metallic aluminum particles, the median particle size (by number) of the aluminum being from $20\mu$ to $100\mu$ and not more than 20% by weight of the aluminum particles being of particle size less than $10\mu$.

2. An opaque film of foamed polyolefin according to claim 1 in which the titanium dioxide has a particle size in the range of from 0.1 to $2.0\mu$.

3. An opaque film of a foamed polyolefin according to claim 1 in which the aluminum particles have a covering power on water of less than 4500 square centimeters per gram.

4. An opaque film of foamed polyolefin according to claim 1 in which the polyolefin composition is low density polyethylene.

5. An opaque film according to claim 1 in which the polyolefin composition comprises a blend of low density polyethylene and a crystalline polyolefin.

6. An opaque film according to claim 5 in which the crystalline polyolefin is high density polyethylene.

References Cited

UNITED STATES PATENTS

| | | | |
|---|---|---|---|
| 3,224,997 | 12/1965 | Hunter | 260—41 B |
| 3,354,115 | 11/1967 | Brandle et al. | 260—41 B |
| 3,523,916 | 8/1970 | Needham et al. | 260—2.5 E |

MURRAY TILLMAN, Primary Examiner

W. J. BRIGGS, SR., Assistant Examiner

U.S. Cl. X.R.

260—2.5 E, 41 B, 93.7, 94.9 GD, 897